United States Patent [19]
Guez

[11] Patent Number: 4,854,696
[45] Date of Patent: Aug. 8, 1989

[54] METHOD AND APPARATUS FOR PLACING INDICIA ON CINEMATIC FILM

[76] Inventor: Moshe Guez, 95 Bridle Path Cir., Randolph, Mass. 02368

[21] Appl. No.: 26,417

[22] Filed: Mar. 16, 1987

Related U.S. Application Data

[63] Continuation-in-part of Ser. No. 521,731, Sep. 9, 1983, and a continuation-in-part of Ser. No. 610,937, May 17, 1984, and a continuation-in-part of Ser. No. 833,522, Feb. 24, 1986, abandoned, said Ser. No. 610,937, is a continuation-in-part of Ser. No. 592,933, Mar. 23, 1984, abandoned.

[30] Foreign Application Priority Data

Sep. 6, 1982 [IL] Israel ........................................ 66817

[51] Int. Cl.⁴ ............................................ G03B 21/32
[52] U.S. Cl. ........................................ 352/90; 355/53; 355/77; 355/40; 219/121.68
[58] Field of Search ...................... 352/90; 355/53, 77, 355/40; 219/121 LH

[56] References Cited

U.S. PATENT DOCUMENTS

| | | | |
|---|---|---|---|
| 3,518,925 | 7/1970 | Chitayat | 219/121 LH |
| 3,588,439 | 6/1971 | Heller et al. | 219/121 LH |
| 3,632,205 | 1/1972 | Marcy | 355/53 |
| 3,657,510 | 4/1972 | Rothrock | 219/121 LH |
| 4,225,224 | 9/1980 | Balasubramanian | 355/77 |
| 4,458,994 | 7/1984 | Jain et al. | |

FOREIGN PATENT DOCUMENTS 2036369 6/1980 United Kingdom ............... 352/90

OTHER PUBLICATIONS

Article "Square Blue Laser" *Popular Science*, May, 1983, pp. 86, 87.

*Primary Examiner*—Monroe H. Hayes
*Attorney, Agent, or Firm*—Darby & Darby

[57] ABSTRACT

Disclosed is an apparatus for applying indicia to processed cinematic film, where film includes a cellulosic substrate layer and at least one emulsion layer. The apparatus comprises:

a UV pulse laser for generating a laser beam capable of vaporizing the emulsion;
a mechanism for directing the beam to the emulsion;
a mask interposed between the laser and the film; the mask has UV-transparent portions in the shape of the indicia, which allow the beam to pass through the mask and impinge upon the film and vaporize the emulsion in the shape of the indicia;
a modulator responsive to the indicia for controlling the intensity and duration of the beam;
a film transport mechanism;
an alignment mechanism for aligning the laser with the indicia and with a frame of the film; and
a transport mechanism responsive to the indicia for transporting the film to bring a desired film frame in alignment with the laser mask.

17 Claims, 5 Drawing Sheets

METHOD AND APPARATUS FOR PLACING INDICIA ON CINEMATIC FILM

This application is a continuation-in-part of my co-pending application Ser. Nos. 529,731 filed Sept. 9, 1983, 833,522 filed Feb. 24, 1986, now abandoned and 610,937 filed May 17, 1984 (now allowed), the latter also being a continuation-in-part of my co-pending application Ser. No. 592,933 filed Mar. 23, 1984 now abandoned. The disclosures of all of these applications are incorporated by reference.

FIELD OF THE INVENTION

The invention relates to the application of graphic designs by means of a laser beam to cinematic films, and especially to developed negative or positive films. There may be applied animation titles and texts and subtitles. The desired script is applied to cinematic film by laser beam of predetermined type and intensity.

BACKGROUND OF THE INVENTION

A number of methods are available for applying subtitles and translations to existing movie films, and these can be grouped into three main groups:

(a) photographic negative title systems based on the use of a negative animation camera loaded with a high contrast film;

(b) application of the desired script by means of a lettering set applied by heat; this method involves the use of heat and of a chemical etching treatment of the film to soften the emulsion prior to the application of the script by a stamping process.

(c) application of heat and etching as in (b), but using a coating of wax on the film, stamping the text on the wax and etching the revealed emulsion of the film to form the desired characters.

System (a) is the most expensive one. A separate high contrast transparency or film is used having the same length as the movie film. The added film is superimposed on the existing one and bears the required titles and lettering. This method is highly complex involving making one or more negatives of the superimposed subtitle and actual file transparency. This method is economically feasible only when a large number of films is to be produced.

System (b) comprises preparing a separate film bearing the desired titles, preparing from the film reduced-size copper or zinc casts of the size to be applied to the cinematic film, softening the emulsion of the cinematic film, stamping the film in a special device by means of the heated cast letters, and advancing intermittently frame after frame so as to apply to the required number of frames the same title and changing the other titles as the film is advanced, as required.

On the average, a cinema film has about 600 to 1000 such printed lines. Each printed line has to be reproduced on a number of frames to be perceptible and readable by the human eye. After applying all the required printed lines, the film is subjected to another treatment for hardening the emulsion. As a rather large number of different cast molds is required, errors are likely to occur, for example in the synchronization of the cast and film frame, or in the sequence of the subtitles. In addition, after application to a number of frames, the cast letters tend to become less sharp, and unclear lettering results due to accumulation of debris.

System (c) is similar to system (b), but wax coating is applied to the film and the lines are imprinted on this layer. These lines thus remain sharp but become wavy After the stamping process, the film is subjected to a special treatment which etches the exposed locations of the surface, thus resulting in a sharp print of the required lines, after which the wax layer is removed in another solution. This method is more expensive, and it has the inherent danger of etching the film too much if the wax coating does not have exactly the required thickness and uniformity.

OBJECTS OF THE INVENTION

It is an object of this invention to provide a process for applying script or other indicia to processed and developed, positive or negative, color or black/white cinematic film.

It is another object of this invention to provide a process for placing indicia on cinematic film by means of a laser beam of sufficient frequency intensity area and duration to vaporize the photographic emulsion on the film while leaving the film substrate intact.

Another object of this invention is to provide the process for applying clean, sharp, indicia on cinematic film without damaging the film and without causing the transmission of any heat in the area of the film (which could damage the emulsion of the film or its substrate) adjacent to that on which the indicia are placed.

Another object of the present invention is to provide a mask for inscribing indicia on processed cinematic film which permits sharp, clean, uniform indicia to be applied.

Another object of the present invention is to provide a single mask device containing all of the subtitles to be applied to the film.

Another object of this invention is to provide a mask for applying indicia on cinematic film, said mask being capable of long use involving exposure to the aforementioned type of laser beam.

Another object of the present invention is to provide a mask which will include the desirable indicia. In addition, it will also include all the information needed to control the system and synchronize the appearance of the frame in the focus of the laser with the inscription of the appropriate subtitle.

Another object of this invention is to provide a control device to block the laser pulses, once the entire emulsion has been removed by means of a device as a photo-detector, servo mechanism.

Another object of the present invention is to provide a high-speed continuous (not intermittent) method for emplacing indicia on cinematic film. The term "high-speed" means that millions of characters can be marked on cinematic film in a matter of minutes.

Another object of the invention is to provide a process for emplacing indicia on multiple copies of processed cinematic film at one time simultaneously.

Another object of the invention is to provide a process for subtitling 3-dimensional film.

SUMMARY OF THE INVENTION

According to the present invention, there is provided a system and process for applying script to cinematic film by means of a UV laser beam which vaporizes the emulsion on the film thus creating the desired indicia while leaving the substrate intact.

According to one embodiment of the invention there is provided a mask bearing the required script and the laser beam is enlarged and projected through the mask by a suitable optical system and then reduced and focused on the desired film frame where the laser energy vaporizes portions of the emulsion and results in the formation of the desired script, image or indicia.

The novel device and process is of special value where a small number of copies is required as the existing methods are rather expensive and applicable only where adequate funds are available or where a large number of copies of a film are to be provided with subtitles. But the present invention is also well-suited for a large number of copies, as it is capable of processing multiple copies of a film simultaneously.

The invention is described by way of illustration only with reference to the enclosed schematical drawings, which are not according to scale and in which.

DETAILED DESCRIPTION OF THE INVENTION

Figure 5:
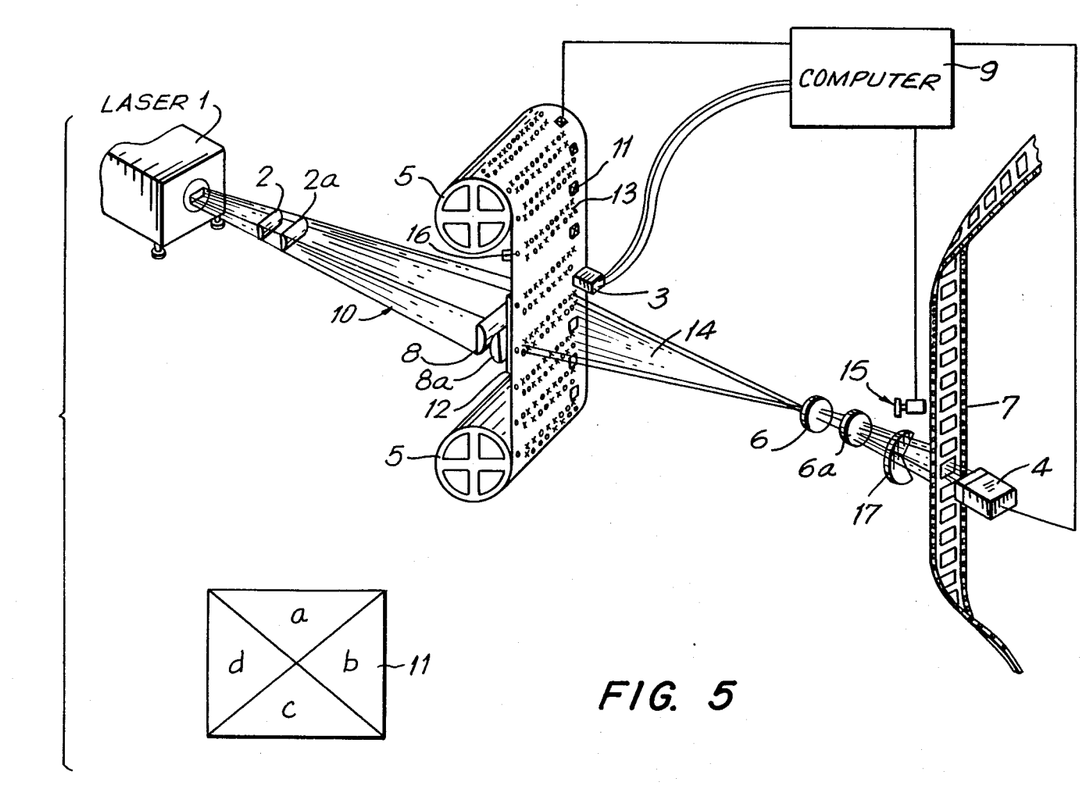
FIG. 5 is an exploded representational view of the system of the present invention in operation (not in scale)

As shown in FIG. 5, the system for applying indicia, such as subtitles to cinema film comprises in combination a UV pulse (excimer) laser 1 which provides a laser beam 10 of adequate frequency area and intensity. The beam dimensions are preferably modified by means of (cylindrical) lenses 2 to reduce the height of the beam and 2a to expand the area of the beam so that it covers the relevant area of mask 13 which bears the template of the indicia that are to be transferred on the film 7. After lenses 2, 2a, the beam goes through spherical (beam-condensing) lenses 8, 8a which concentrate the beam and permit it to go through lenses 6 and 6a and contribute to adjustment of the size of the imaged beam as focused on film 7.

The original laser beam is preferably 10×24 mm in area. The expanded laser beam (through cylindrical lenses 2, 2a) is preferably 20×95 mm (of course how much the beam is expanded depends on the size of the mask used). (In a preferred embodiment the portion of the mask that contains one set of dialogue is about 12×75 mm.)

The expanded beam 10 passes via square aperture 12 onto mask 13 which contains the indicia (text of dialogue) to be printed on the film. The characters are transparent to the beam to allow it to go through without harming the transparent mask substrate. The remainder of the mask is UV-opaque.

The mask 13 is preferably constructed as a roll rolled on reels 5 with each line (or set of lines) of dialogue imprinted on it as will be described below.

The beam 14 emergent from the mask is then projected by suitable optics (spherical lenses 6 and 6a) and reduced in size so that the size of the beam will be in scale for creating subtitles on the actual film.

The characters are created on the film because the pulse laser selectively removes by vaporizing the emulsion (and any intermediate film layers) leaving only the clear cellulosic substrate of the film. The characters thus appear on the film as clear characters against a colored or black background of the emulsion.

The emulsion is vaporized layer by layer (colored processed film has 7 layers of emulsion) by the pulse laser. In a few pulses, all the layers can be removed. The clear film substrate is not affected. The resulting characters are very clear with extremely sharp edges.

Once the laser vaporizes the emulsion, it emerges on the other side of the film 7 and is detected by a sensing devise (photodetector) 4 which is adapted to read the intensity of the laser emerging on the far side of the film. Once the intensity of the laser reaches the preselected value, the device 4 signals the control computer 9 from which blender 16 is instructed to cover the frame of the film and stop the laser from reaching the film.

The film transport mechanism 15 (also controlled through the computer 9) is then activated and the film is advanced continuously while preselected frames of the film are being submitted.

After a given set of dialogue is printed on the required number of frames, the mask is also advanced to the next line of dialogue. This is controlled by the computer also via bar code reader 3.

Mask 13 also contains all the information needed to coordinate the system. For example, bar code signal 11 contains at least four pieces of information (a-d): the identification number of the first film frame on which a particular dialogue segment should be imprinted; the number of frames on which the dialogue will appear; and the footage of film without dialogue in between two consecutive dialogue-bearing sections.

Also the mask bears another mark (such as pinhole 16) which is used to align the mask with the laser.

The "dead" time of the laser (i.e. while the layer is blended and the film footage is being advanced) can be used to advantage. The laser can be directed to another film (during the time that the first film is being advanced) and can be used to create subtitles into the second film. In fact, multiple copies of a film may be thus subtitled simultaneously. Advantageously, the multiple films will be coordinated so that the same set of subtitles will be processed through all of them, seriatim. Processing of multiple films is made possible by use of scanning mirrors which sequentially reflect the beam emerging from the mask to each copy of cinematic film desired to be processed. The operation of the scanning mirror is controlled in accordance with the photodetector.

According to a preferred embodiment of the invention, there is first prepared a mask bearing the required script in the form of transparent letters on an opaque substrate (carrier). There may be used a suitable metal foil substrate (such as copper or aluminum foil) on which there is provided a photoresist emulsion. The blank mask is exposed to the desired text, and after suitable treatment the exposed script is etched away from the metal foil, leaving the desired mask.

Figure 1:
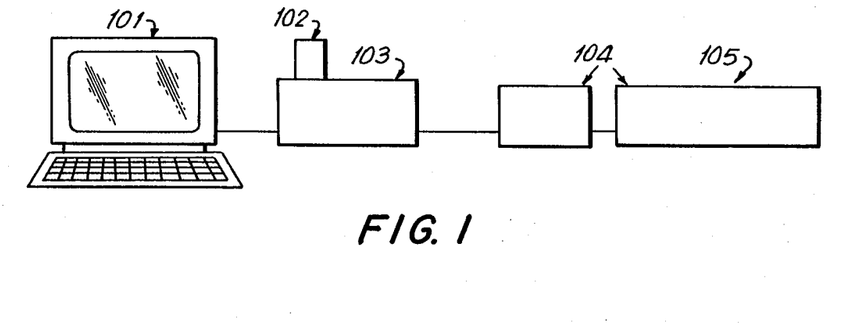
FIG. 1 is a schematic drawing of a system for typing the dialogue and generating a mask.

With particular reference to FIG. 1, a typewriter or word processor 101 can be used for actuating a sequence of letters etc., the text being applied to (or printed on) the mylar protector of the photoresist surface by a suitable means (such as printer 103). (Different languages may be thus printed by changing the font cartridge of the printer 103). The print (preferably in opaque or safe-light color) is applied on the mylar protector of the photoresist coating of the mask. The printed mask is then exposed to UV light which activates the photoresist, the mylar is peeled off and the photoresist is developed and etched (schematically shown as the box 104). After development, etching and conventional treatment, the desired mask is obtained. Suitable materials for such masks are opaque-to-UV materials, such as copper, brass, aluminum and the like. An indicative thickness of such foils is preferably 2/1000 to about 3/1000". To such metal foil there may be applied on one or both sides a photoresist, i.e., a light-sensitive coating applied to a substrate which is exposed and developed in stage 104 prior to chemical etching in stage box 105. The exposed areas serve as a mask for selective etching.

A particularly preferred mask is a continuously rolled laminate of a metal foil and a UV-transparent plastic approximately 4" wide, wound on a reel. The photoresist material is borne on the metal side of the laminate and is protected by a transparent protective layer (such as mylar). All the desired dialogue from the script of the film is etched through the metal part of the laminate. This mask is then used to project the images of the etched dialogue onto the cinematic film.

The etched dialogues usually consist of one or two lines of alpha-numeric symbols per applicable frame of film. In the present invention the text lines need not be limited to 36 character spaces per line, as are in existing systems, but can contain as many spaces as practical for readability.

In addition to the dialogue, the mask also contains the following etched through features.

1. A registration mark to line up the lines of dialogue on the mask with the appropriate place on a film frame.

2. An identification number or symbol for each set of two lines of dialogue.

3. An identification symbol to instruct the number of frames of film to be marked with the same two lines of dialogue.

4. An identification symbol corresponding to the footage (number of frames) that are to bear no indicia, between one set of lines of dialogue and the next.

One of the advantages of this type of mask is that "closed letters" such as "o" appear on it as a complete circle. The UV-transparent layer serves to hold the opaque interior of the "O". Therefore, the present system uses full unbroken characters instead of stencil-shaped characters.

On a regular stencil mask for example, the letter "o" would have to have its center held up by two supports and would appear as two crescents facing one another. In addition to the undesirable appearance of stencil-type lettering, the supports are undesirable because they are very thin and likely to be damaged with use.

The present invention etches the letters through the metal portion of the rolled mask referred to previously, which is a laminate of metal and UV-transparent plastic.

The plastic is neither penetrated by the indicia etched into the metal nor affected by the development or chemical treatment but remains an unbroken backing to the etched metal, and carries all portions of the lettering.

The plastic layer transmits the laser beam (i.e., it has practically no absorbance at the UV laser wavelength) passing through the etched indicia in the metal. Because it does not absorb the laser beam, the plastic layer is not subject to degradation of any kind from the laser beam.

The plastic layer is preferably made from treated polyethylene or teflon F.E.P. material (the latter from e.g. Dupont, Wilmington, Del.), 0.001" in nominal thickness. The treatment of the polyethylene sensitizes the plastic for transmission at the wavelength of the laser beam (200–308 nm for the excimer laser) and makes the plastic adherent to the laser-opaque (metal) layer.

Three preferred processes to prepare the mask are given as examples below, although other processes may be used effectively:

1. Metal Foil Clad Plastic

This is a lamination of 0.0014" thick flex-grade copper clad onto one side of plastic (0.001" thick) by a high-pressure-sensitive epoxy cast film 0.001" thick.

One source for this material is "FORTIN" Industries, Sylmer, Calif. That company's catalogue identification for the material is 410 series, poly core EF, (EF-011 RA). Other sources are Chromeric Laminating, Inc., Woburn MA or Tech-Etch, Inc., Plymouth, Mass.

To produce the etched indicia, the metal foil (only) of the laminate is clad with an aqueous dry film photoresist, such as that available from DuPont under No. 3813 or one sold under the mark DYNAKEM made by Morton-Thiokol, Woburn, Mass. In general, however, any cool emulsion photoresist can be used.

The photoresist is exposed to UV light through a positive artwork master of the indicia placed on the protector layer of the photoresist (clear background with black characters) and is developed to reveal the metal foil under the indicia characters in the photoresist. Any photoresist developer can be used, preferably as comparable with the photoresist as possible with KPR developer (from e.g., Kodak) being particularly preferred.

The indicia characters are then etched into the metal foil. A particulary preferred etching agent is Etch-O-Graph 42 ferrichloride, (e.g., from Etchomatic, Waltham, Mass.) although other commercially widely available agents can be used. Finally, the epoxy adhesive which appears through the etched indicia is removed by using an acidic solution, for example, a dilute solution of chromic acid or sulfuric acid, cleaning and revealing the plastic substrate through which the laser beam is transmitted, said plastic still exhibiting the same light transmission properties at 200 to 308 nm (for an excimer UV laser beam) described above.

The remaining photoresist is also stripped off by the acid-cleaning step described above.

2. Metal Plating on Plastic:

The treated plastic described above is clad on both sides with the photoresist mentioned above. The photoresist is exposed to UV light (on one side only) through a negative artwork master of the indicia (black background, with clear characters) while the photoresist on the other side is exposed to UV light over its entire surface without using artwork.

Both photoresist sides ar developed. The entirely exposed side of the photoresisted plastic (without the artwork indicia) keeps the photoresist in its entirety, and is thus protected from the next plating process.

On the other side of the photoresist-coated plastic (that which was exposed with the artwork indicia) the background photoresist is dissolved, thus revealing the plastic substrate which is to be plated. Consequently, the form of the indicia characters remains now composed of the photoresist material which protects these characters from the plating process.

Next, the plastic with the exposed and developed photoresist is placed in a metal plating bath which plates metal only on the revealed background around the indicia in the photoresist.

The final step is to strip the photoresist from both sides resulting in an opaque metal background containing transparent indicia which transmit the laser beam of the excimer frequency.

3. Metal/Photoresist Composition on Plastic:

The treated plastic described above is laminated to a homogeneous composition of metal and photoresist which is clad on a thicker plastic substrate.

The composition of metal and photoresist is exposed to UV light through a positive artwork master of the indicia (clear background with black characters) on the side of the treated thin plastic.

Following the exposure, the entire lamination is submerged in a hot water bath. The heat of the bath separates the exposed portions of the photoresist/metal composition from the unexposed portions of it.

When this laminates is removed from the hot water, the two plastics (the treated UV-transparent plastic and the thicker substrate) which comprise the lamination are now peeled and separated apart.

This creates two transparent masks which are formed from the metal/photoresist composition, a negative and positive one. The mask with opaque background (negative) is used.

The thin treated plastic results in clear indicia characters with an opaque background of a metal/photoresist composition, and it is used as a mask for the present invention as it transmits the excimer laser beam frequency.

One source of this laminate of metal/photoresist composition is from KIMOTO, Inc., Japan (Kimoto Dry Peel:KDP).

4. Mask Without Separate Artwork

The most preferred mask according to the present invention comprises a UV-transparent teflon substrate clad to a metal substrate layer overlaid on the other side with a photoresist layer. A protective peelable mylar layer covers the surface of the photoresist that does not abut the metal.

The teflon (or polyethylene) substrate should be treated to be receptive to a layer of adhesive by any method well-known in the art. Cladding of the metal layer is also done by conventional means. A preferred method is treatment with e.g., TETRA-ETCH available from W. L. Gore and Assoc., Inc. Newark, Del. or from Dupont. The photoresist is applied on the metal layer by first removing one of the two mylar protective layers from the photoresist (bare side facing the metal) with the metal layer clad on the substrate.

Figure 6:
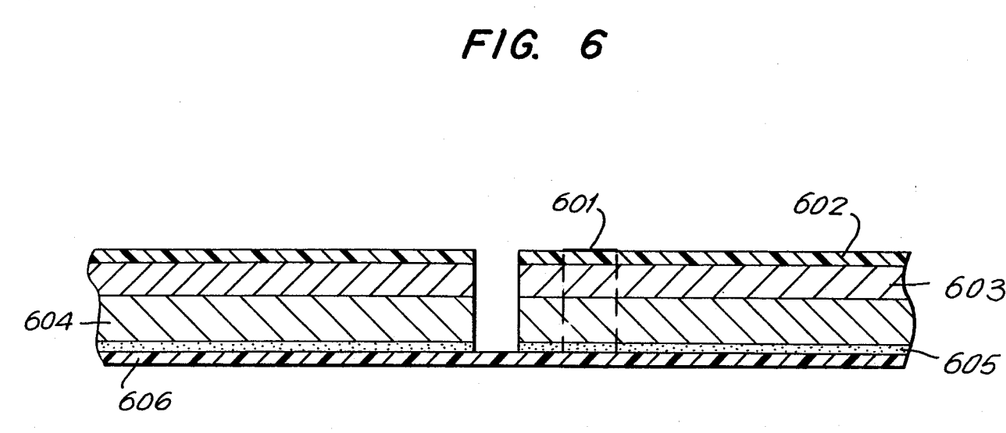
FIG. 6 is a schematic cross-section of the mask material according to the invention.

The mask is illustrated in cross-section in FIG. 6. The teflon or treated polyethylene substrate 606 is attached to the metal layer 604 by adhesive layer 605. Photoresist (photosensitive) layer 603 is clad on metal layer 604. Mylar protective layer 602 of the photoresist is removed only after exposure. (The printed characters are illustrated by black bar 601.)

The characters are printed or typed on the mylar. The photoresist is then exposed to a light source to which it is sensitive (preferably UV-sensitive photoresist is used). The mylar layer is peeled off and the photoresist is developed. This results in exposure of the metal layer in the shape of the characters against a photoresist background.

The exposed metal substrate is etched revealing transparent characters. The remaining photoresist is stripped. If the metal is clad onto the substrate with an adhesive, any remaining adhesive on the revealed transparent substrate should be also stripped.

The result of stripping is a mask flexible enough to be rolled on a pair of reels (as a scroll). The teflon backing permits the laser to go through and protects the metal centers of characters such as "O".

The masks prepared as described above permit "closed" clean and sharp letters to be written onto the film; and are capable of a long useful life. The masks can also be prepared in one continuous roll containing all of the dialogue. They are inexpensive and they contain symbols which permit the subtitling process to be entirely automated with the use of a small computer. In addition, one size of mask can be used for all sizes (e.g., 8-70 mm and others) of film. The subtitle size is regulated by optics. The same masks can also be used for 3-D (three dimensional) type film.

Alternative Method For Exposing The Mask

A spinning disk system is provided having transparent characters on the disk. Such spinning disks are available commercially from ITEKS (Oregon), COMPU-GRAPHIC (Massachusetts), VARY-TYPE (New York) and others. The script of the dialogue is typed and stored on a floppy disk or computer tape.

A UV light lamp can be used.

The blank foil mask is used to expose the characters with the UV light through the spinning disk. The entire text may be thus imprinted on the mask roll in a matter of minutes.

The spinning disk is electronically controlled and coordinated with the data on floppy disk or tape. The exposed mask roll is then developed.

In addition, it is possible to use the excimer laser to create the mask. The excimer laser is directed to the spinning disk. The laser vaporizes the photoresist on the mask roll in the shape of the characters. No development is thus necessary because the laser removes the photoresist.

The exposed/developed or laser-exposed mask is etched so that clear transparent indicia ar revealed. If the mask has been laser-exposed no removal of the remaining photoresist is necessary.

The Laser of the Present Invention and Its Use

A UV excimer laser of up to 45 (preferably 25-45) W power with a wavelength of 157-351 nm (preferred 248-308) with 80-150 pulses output per second is used to provide a beam. When a cinema film is exposed by such laser beam via a mask, a fully transparent script can be obtained on the film by a sequence of about 6 to 10 pulses. Therefore, subtitles can be applied while the film is in continuous motion using a laser blender to prevent the laser from printing on the portion of the film where subtitling is not desired.

A particularly suitable type of laser is a UV Excimer produced by many companies including the following companies: Lumonics, Inc., Tempa, Ariz.; Questek, Inc., Billerica, Mass.; and Lambda Physics, Inc., Lexington, Mass. The laser may preferably have a pulse energy of 400 mj, average power 45 watts, 248 mn wavelength in KrF gas, repetition rate up to 150 Hz (or 750 mj, 40 watts, 248 nm and up to 80 Hz) and a cross-section of $10 \times 24$ mm area. XeCl (308 nm) can also be used having a power of 40 watts and 450 mj energy with a repetition (pulse) rate of up to 175 Hz. (In the latter case a mask with a plastic transparent at the latter frequency should be used.)

The preferred optical pulse duration is 20 nanoseconds. Usually, the original laser beam size is about 10 mm by 24 mm. It is expanded by a set of cylinder lenses to a size of about 20 mm by 95 mm, i.e., a size large enough to cover the entire surface of the mask including of course the indicia (two lines from the roll mask which includes 72 characters or more) with uniform intensity. The laser expansion is preferably done as shown in FIG. 5 to change the rectangular shape of the laser to one closely conforming to the dialogue lines.

Through suitable lenses, the laser beam emerging through the indicia from the mask is reduced approximately five times.

This concentrated beam is then projected and focused through the indicia onto the emulsion of the film, which is effectively vaporized layer by layer with each laser pulse. The end result is a transparent imprint of the indicia on the cinematic film.

The amount of energy per pulse, the number of pulses per application and the number of pulses per second are controlled by an off-on switch. A blender may be used to blend the laser beam during the period of time that the frame of the film or the mask (or both) is changing position.

First, the dialogue (indicia) mask roll is set on the mask holder device; the laser is turned on and starts to pulse through it, and literally vaporizes or "bursts" imprints of the indicia on the first film frame by vaporizing portions of the emulsion on the film corresponding to the dialogue. The laser thus leaves only the clear substrate of the film in those portions. After all of the emulsion and any intermediate layers is vaporized through, the laser is able to emerge through the film substrate and can be detected on the other side by the photo-detector mechanism which is connected to a servo-control mechanism.

Once the photo-detector, servo control (which is located behind the film) is able to discern a predetermined intensity of the laser beam through the indicia, and through the film substrate, it gives orders to blend the laser beam. This can be accomplished through a blender/shutter which turns off the laser beam or prevents it from reading the film. The film is then advanced to the next frame ready for the laser's operation. This operation is very fast when the laser prints on consecutive frames. All the elements of the present assembles (the laser, the blender and the film) except for the mask are in continuous motion.

Each pulse of the laser removes a portion of the photographic type emulsion that has been applied on the cinematic film by vaporizing it. Additional pulses after the first one remove remaining portions of the emulsion, layer by layer, causing no damage to the cellulosic (or ESTAR) substrate of the cinematic film. The main reason for this is that the cinematic film does not absorb at the laser frequency. Thus, no heat is transferred onto the cellulosic (or ESTAR) substrate and therefore, no heat is transferred to the area adjacent to that on which the script is to be applied. Consequently, the adjacent emulsion of the film is not harmed and the images applied on the cinematic film are very clear and sharp.

Another advantage of the present invention is as follows: The amount of emulsion on the film is not necessarily the same on all portions of the film. Cinematic films are typically coated with multi-layer emulsion and especially if the film is in color, then they can have as many as seven layers of emulsion including interlayers and overcoats. Upon exposure and during development of the film, portions of each layer are removed depending upon what kind of color the film is to show at any particular point. Thus, the laser does not always have to remove the same thickness of material.

If the film substrate were sensitive to the laser energy, then a portion of the substrate that were lying under "thin" portion of the emulsion, would be subjected to a greater amount of laser energy and would be subjected to deterioration. This does not happen by use of the present invention.

According to the present process, only about 6 to 10 pulses are required per frame to obtain the desired subtitle effect on the film. Thus, a number of frames on the film can be dealt with per second. Consequently, a much more rapid and economical process is provided. For example, a 2-hour film typically contains about 800–1000 sets of lines of dialogue. Each set of lines must be printed on the average on about 37 frames. Hence, each film requires subtitling of about 30,000 frames.

It is to be noted that writing lasers cannot be used for writing film subtitles. In addition to the fact that writing with a laser (by moving it in an x-y coordinate system) is quite slow (and would render the subtitling process uneconomical) it does not work. The writing laser would have to be continuously refocused since the film surface is not level but a different number of emulsion layers are removed to create different colors. Consequently, the laser focus would have to be adjusted according to the color (and thickness of emulsion to be removed) that the laser would be writing on at any given time. Finally, when many layers of emulsion are present, a writing laser can only remove them by writing repeatedly over the same area (as many as 5 times have been reported).

An important advantage of this technique of this invention is the speed at which subtitles and other script or graphic designs can be applied to cinematic film. Each exposure by the laser beam applies the entire script of the mask, generally one or two lines. As the output of the laser is up to 100 pulses per second, and as about 6 to 10 pulses are required per frame to obtain the desired effect on the film, a number of frames of the film can be dealt with per second. Thus, a much more rapid and economical process is provided in comparison with direct writing on the film by a computer controlled laser beam.

The identification marks on the mask roll associated with each subtitle are also "seen" by the laser and are "read" by photodetectors connected to the same control mechanism which then advances the film or the frame as directed, or duplicates the particular subtitle as many frames as directed. Synchronization is not a problem since all the information necessary to subtitle and to control the process is on the mask.

If more than one film is subtitled simultaneously, the same mask can be used to process all of the copies of each film. A number of frames X on the first film is first subtitled. The laser is then directed to the same frames on the second film while the first film is advanced to the first frame that is to receive the following subtitle. The mask is changed while the second film is advanced, etc.

Figure 2:
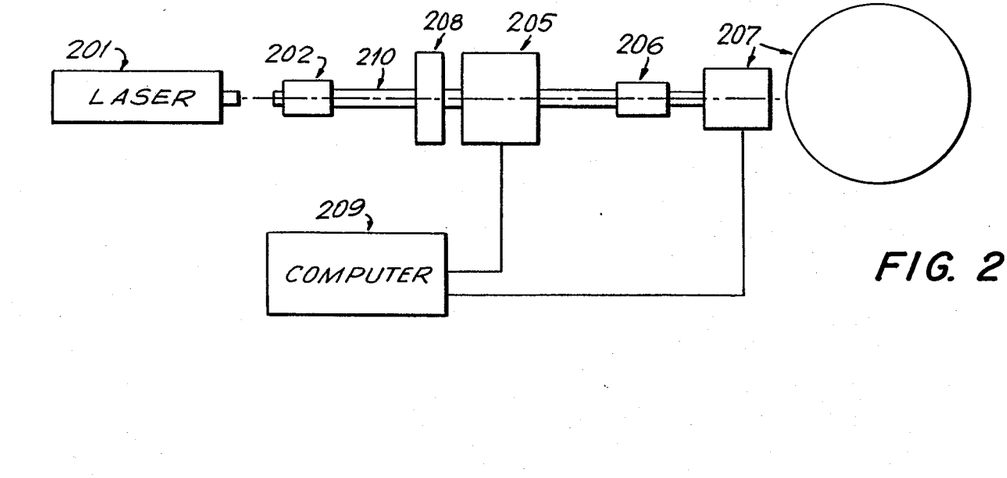
FIG. 2 is a schematic drawing of the complete system for applying indicia to a film.
Figure 3:
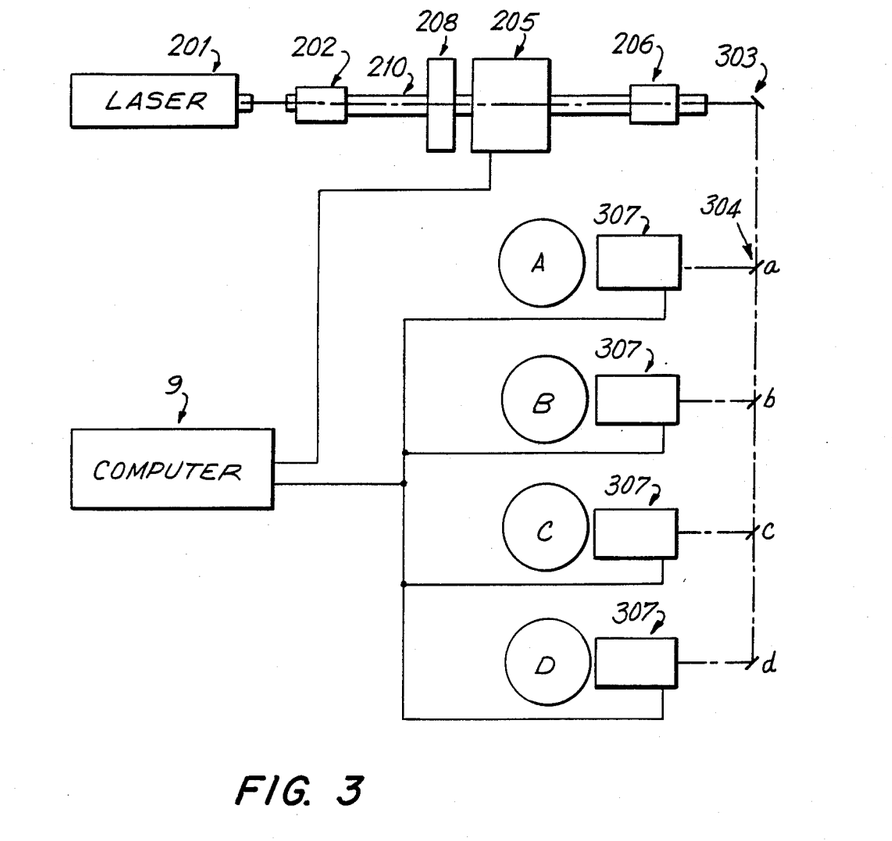
FIG. 3 is a schematic drawing of a system according to the present invention for applying indicia simultaneously to multiple copies of the same film.
Figure 4:
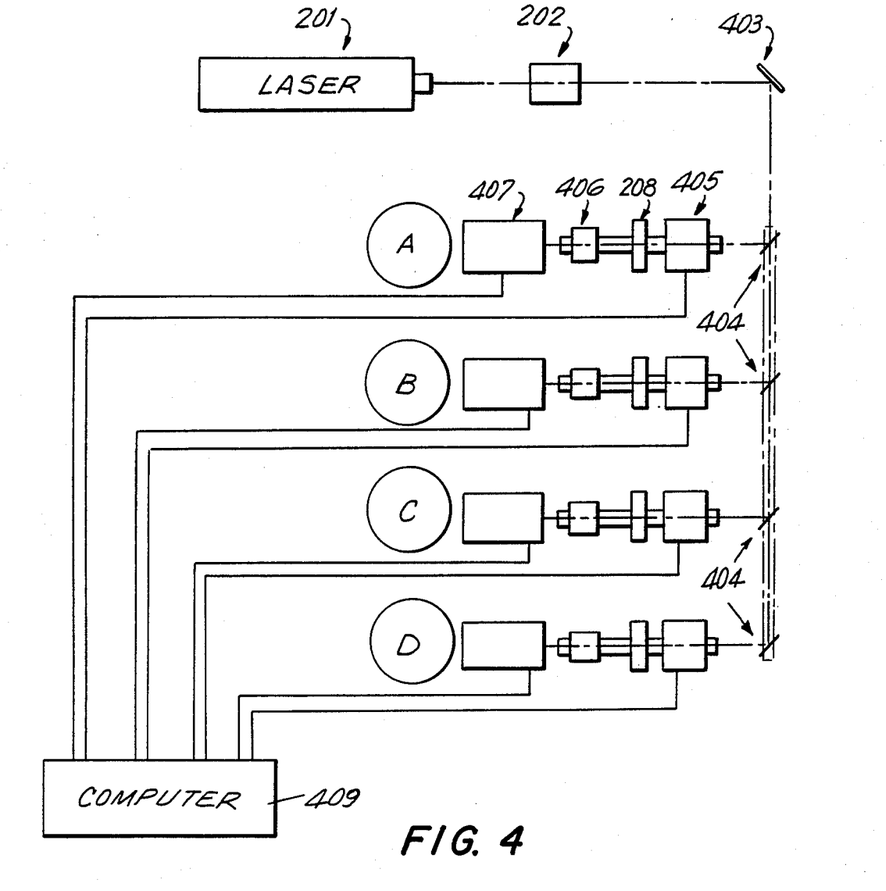
FIG. 4 is a schematic drawing of a system of the present invention for applying different indicia to each of multiple films.

It is also possible to use a scanning mirror arrangement to have even more films processed truly simultaneously, as shown in FIG. 3, wherein four copies of a film are processed simultaneously. FIG. 2 represents in diagram form the system of the present invention as it is used for one film. This basic diagram is repeated in FIG. 3 and 4 about to be described.

Laser 201 passes through optics 202 and 208 to be size-adjusted and then impinges on masks which bear the template of the indicia. The laser emerging from the mask is again directed through optics 206 to concentrate it and onto the film mounted on a transport mechanism 207. The operation is controlled through computer 209 as described above.

In FIG. 3, the laser beam 1 is passed through the system described above and directed onto mirror 303 at 45° to the beam. The laser beam is thus deflected at 90° of its original orientation. Four units of film transport 7 are arranged in parallel as shown in FIG. 3. The film is advanced in each unit as controlled by the computer 9, which is hooked up to the mask 5 and "reads" the mask instructions on the number of frames on which a certain subtitle is to be printed and the number of no-subtitle frames that have to be advanced before the next subtitle is to be recorded on the film.

Four mirrors 304a-d are placed in the path of the 90°-deflected laser beam emerging from mirror 303. Each of the mirrors 304 is rotatable such that it can receive all of, part of or none of the deflected laser beam from mirror 303. First mirror 304(a) is positioned at an angle to receive the beam and deflect it to the first film for the creation of one subtitle. After this is finished, the mirror 304(a) is rotated so that it no longer receives the beam and the mirror 304(b) receives the beam wherein the application of the same subtitle takes place, on the corresponding frame of the second film. In the meantime, the first film is advanced to the next frame.

The effect of this is that the process is practically nonstop. The laser beam is continuously deflected. There is no "down" time because when a frame of the first film is being subtitled with one set of dialogue lines, the second, third and fourth film are being advanced. When the second film is being subtitled with the same line, then the remaining three films are being advanced etc.

One laser can be used, in continuous operation. The films are advanced with a one frame difference one from the other. This permits four copies of a film to be processed in about six hours.

It is also possible to have again one laser and many copies of a film to be subtitled simultaneously in different languages, (or different films) can be subtitled simultaneously. This embodiment employs the arrangement of FIG. 4. Different masks are provided for each film. The laser beam is deflected again by mirror 403 (similar to 303) but it is not an imaged beam. The imaging of the beam takes place separately for each film. Again, the number of frames without subtitles are controlled by computer. The films again are processed "out of phase." The first film is being subtitled in one frame. Then the first film frame is advanced during which time a frame of the second film is processed and so on.

The invention has been described in terms of preferred embodiments. However, it will be obvious to those skilled in the art that omissions, modifications or additions are possible without departing from the scope of the invention as claimed below.

What is claimed is:

1. An apparatus for applying indicia to processed cinematic films, said film comprising a cellulosic substrate layer and at least one emulsion layer, said apparatus comprising:

a UV pulse laser for generating a laser beam capable of vaporizing said emulsion;
means for directing said beam to said emulsion;
mask means interposed between said laser and said film, said mask means having UV-transparent portions in shape of said indicia, said portions allowing said beam to pass through said mask means and impinge upon said film and vaporize said emulsion in the shape of said indicia;
modulating means for controlling the intensity and duration of said beam responsive to said indicia;
film transport means;
alignment for aligning said laser with said indicia and with a frame of said film; and
means responsive to said indicia for transporting said film to bring a desired film frame in alignment with said laser and said mask means.

2. The apparatus of claim 1 comprising optical means as the means for directing the beam of said laser to said emulsion.

3. The apparatus of claim 2, said optical means being also provided for adjusting the size of said beam.

4. The apparatus of claim 3, wherein said laser is an excimer UV pulse laser having an output of at least 25 watts and 100 pulses/second.

5. Apparatus for applying indicia to processed cinematic film comprising:

a UV pulse laser for generating a laser beam of sufficient frequency intensity and duration to vaporize at least a portion of said emulsion;
means for directing said beam to said emulsion;
mask means interposed between said laser and said film having UV-transparent portions in the shape of said indicia for shaping the laser beam in the form of said indicia;
film transport means;
alignment means for aligning indicia on said mask with a frame of said film in the path of said laser;
means responsive to said indicia for modulating the duration of said beam impinging upon said film frame;
means for stopping the impingement of said beam upon said film; and
means responsive to said indicia for transporting said film to bring a desired film frame in alignment with said laser and said mask.

6. The apparatus of claim 5 said mask comprising a UV-transparent substrate and a UV-opaque foil layer clad on said substrate said foil layer having apertures in the shape of said indicia.

7. The apparatus of claim 5 further comprising optical means for directing said beam to said film.

8. The apparatus of claim 2 wherein said optical means comprises a beam size-adjusting lens for adjusting the size of said beam to the size of said mask.

9. The apparatus of claim 8 said optical means further comprising a second beam size-adjusting means for adjusting the size of the laser beam after it leaves the mask to the size of the film frame such that the indicia applied on the film by the laser size proportionate with the size of said film frame.

10. The apparatus of claim 5 further comprising means responsive to said indicia for determining the number of film frames to be marked with a given item of indicia on said mask means.

11. The apparatus of claim 5 further comprising mask transport means for aligning a predetermined item of indicia with said laser beam and a predetermined frame of said film 12. The apparatus of claim 5 wherein said means for stopping said impingement is laser-blending means.

13. A method for making a mask for applying indicia to processed cinematic film said method comprising:
   providing a laminate comprising a UV-transparent substrate having an etchable foil layer clad thereon, a photoresist layer clad on said foil and a printable protective layer clad on said photoresist said protective layer being transparent to a light frequency exposing said photoresist;
   applying indicia on said protective layer;
   exposing said photoresist, causing images of said indicia to be formed on said photoresist;
   removing said protective layer;
   developing said exposed photoresist and causing portions of said foil underlying said exposed photoresist to be revealed, said foil portions being in the shape of said indicia;
   etching said foil portions, revealing portions of said UV-transparent substrate underlying said exposed foil portions in the shape of said indicia.

14. The method of claim 13 wherein said substrate in teflon.

15. A mask for applying subtitles to a processed cinematic film comprising:
   a UV-transparent substrate;
   a UV-opaque foil layer clad on said substrate said foil layer having apertures in the shape of said subtitles, said subtitles being spaced apart from each other; information readable by electronic means associated with each subtitle said information identifying said subtitle, the number and identification of film frames on which said subtitle is to be applied and the number of subtitle-free film frames subsequent to the last film frame on which said subtitle is to be applied.

16. A method for making a mask for applying indicia to processed cinematic film said method comprising:
   providing a laminate comprising a UV-transparent substrate clad on each side with first and second photoresist layers and first and second protective layers each clad on each of said photoresist layers, at least said first protective layer being transparent to a light frequency exposing said photoresist,
   selectively exposing said first photoresist layer, causing negative images of said indicia to form on said first photoresist layer;
   removing said protective layer;
   developing said exposed first photoresist and causing portions of the substrate underlying said exposed photoresist to be revealed;
   plating said revealed portions of said substrate with a layer of metal;
   removing the remaining portion of unexposed first photoresist revealing portions of said substrate in the shape of said indicia and removing said second photoresist.

17. The method of claim 16 wherein said substrate is teflon.

* * * * *